United States Patent [19]

Sakaguchi et al.

[11] Patent Number: 4,844,370
[45] Date of Patent: * Jul. 4, 1989

[54] METHOD AND DEVICE FOR WINDING MAGNETIC TAPE USING MAGNETIC ALIGNMENT

[75] Inventors: Masaaki Sakaguchi; Mitsunobu Usui; Hiroshi Chikamasa; Keisuke Wakatsuki; Seiji Kiuchi, all of Kanagawa, Japan

[73] Assignee: Fuji Photo Film Co., Ltd., Kanagawa, Japan

[*] Notice: The portion of the term of this patent subsequent to Nov. 8, 2005 has been disclaimed.

[21] Appl. No.: 10,516

[22] Filed: Feb. 3, 1987

[30] Foreign Application Priority Data

Feb. 3, 1986 [JP] Japan ................................. 61-21379
Feb. 3, 1986 [JP] Japan ................................. 61-21380

[51] Int. Cl.$^4$ ..................... B65H 75/18; H01F 13/00
[52] U.S. Cl. .................... 242/67.1 R; 242/76; 360/66
[58] Field of Search ...................... 242/67.1 R, 76, 78, 242/78.1, 179, 186; 226/93-97; 360/66

[56] References Cited

U.S. PATENT DOCUMENTS 3,779,476 12/1973 Hofbauer .
3,946,959 3/1976 Sawazaki et al. .
4,343,441 8/1982 Graham .............................. 242/68.1
4,551,782 11/1985 Seely et al. ...................... 335/284 X

FOREIGN PATENT DOCUMENTS 0054633 10/1981 European Pat. Off. .
61-51642 3/1986 Japan .
2104479 7/1982 United Kingdom .

Primary Examiner—Stuart S. Levy
Assistant Examiner—Steven M. DuBois
Attorney, Agent, or Firm—Sughrue, Mion, Zinn, Macpeak & Seas

[57] ABSTRACT

A magnetic tape winding method and apparatus in which a magnetic field is applied to a magnetic tape during winding on a reel to even up the edges of the wound tape. After winding, the magnetic tape is demagnetized.

10 Claims, 6 Drawing Sheets

FIG. 8
FIG. 9
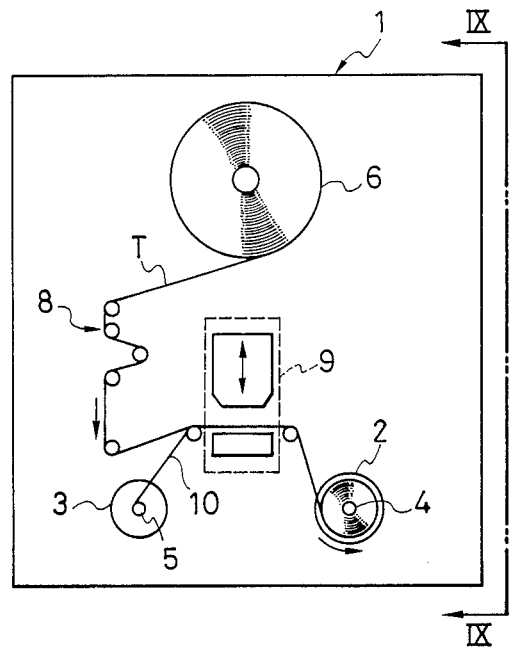
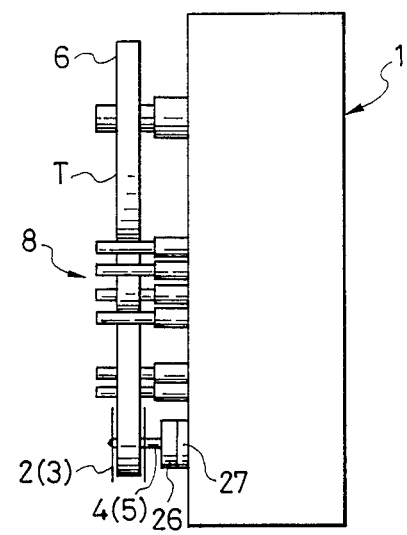
FIG. 10
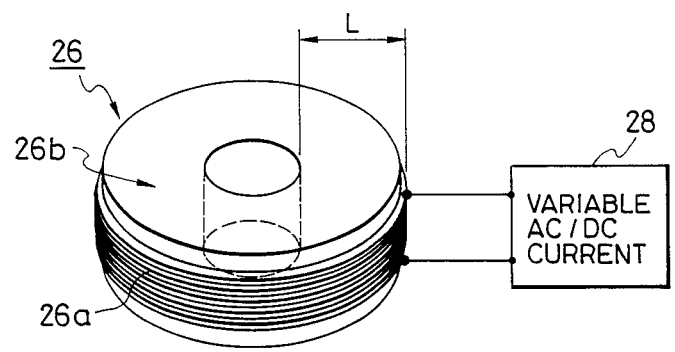

METHOD AND DEVICE FOR WINDING MAGNETIC TAPE USING MAGNETIC ALIGNMENT

BACKGROUND OF THE INVENTION

1. Field of the Invention

The present invention relates to a method and a device for winding a magnetic tape, such as winding a magnetic tape of prescribed length from a source roll of a magnetic tape to a small reel, rewinding a magnetic tape from one reel to another, winding a magnetic tape of large width for a source roll, and winding a magnetic tape of large width to a plurality of reels while slitting the tape.

2. Background of the Invention

A process of manufacturing a magnetic tape such as an audio cassette tape, a video cassette tape, a memory tape and a broadcasting video tape includes a step of winding a magnetic tape of prescribed length from a source roll of a large-length tape to a small tape winding body such as a reel and a hub, a step of rewinding a magnetic tape from a tape winding body to another tape winding body, a step of winding a magnetic tape of large width as source tape, a step of winding a magnetic tape slit from another magnetic tape, and so forth. When the magnetic tape is wound on the tape winding body in the process of the winding or the rewinding, such behavior of the tape as its vibration in the direction of the thickness of the tape and its vibration in the direction of the width of the tape can fluctuate due to the physical properties of the magnetic tape and those of the tape winding body so that each side edge of the tape wound on the winding body is unneatly overlaid on itself. The higher the speed of the winding is, the more unneatly the side edge is overlaid on itself.

A magnetic tape whose side edge is unneatly overlaid on itself as described above has problems of poor external appearance of the wound tape housed as a commercial product in a magnetic tape cassette and the side edge is likely to be damaged resulting in various troubles such as the deterioration of the electromagnetic conversion properties of the tap. The unneat overlaying is a serious drawback, particularly for a magnetic video tape for high-density recording because an audio signal or a tuning signal is recorded near the side edge of the tape. For these reasons, in a conventional process of manufacturing a magnetic tape, the wound reels of all magnetic tape are visually inspected after a winding process or a rewinding process. Since the inspection takes much time and money, the inspection is a major disadvantage of the magnetic tape manufacturing process.

Conventional system, which are shown in FIGS. 1 and 2 and are what is called neat winding, have been adopted to wind a magnetic tape of otherwise low neat-winding yield in order to improve the wound state of the tape to reduce the necessity of inspection thereof. FIGS. 1 and 2 show perspective schematic views of tape winding bodies 2 and the vicinity thereof.

In the conventional system shown in FIG. 1, an endless flexible belt 11 made of rubber, polyimide or the like and rotatably supported by rollers 12, 13 and 14 is revolved together with the magnetic tape T and elastically pushes the magnetic side of the tape in the radial direction of the tape winding body 2 to neatly wind the tape.

In the other conventional system shown in FIG. 2, a belt 15 made of a relatively soft nonwoven fabric or the like is provided between one flange of the tape winding body 2 and one side edge of the magnetic tape T to push the side edge of the tape. Meanwhile, the belt 15 is supported by a roller 17 or the like and wound at a low constant speed from a belt supply spool 16 to a belt winding spool 18, so as to neatly wind the tape.

However, since the belts 11 and 15 are placed in direct contact with the magnetic tape T in the above-mentioned systems, there are various problems that the magnetic layer of the tape is worn or the fibers of the nonwoven fabric come off to locally hinder recording on the tape, inappropriate pressure acts to deform the tape or damage its side edge, and so forth. For that reason, the systems do not function properly. In addition, since the wear and tear of the neat winding systems are large, they have disadvantages with regard to their cost and maintenance as well. The construction of each of the systems needs to be such that the tape winding body 2 is moved between at least a working position and a non-working position when it is replaced. This construction makes the magnetic tape winding device complicated and renders it relatively time-consuming to replace the tape winding body. The period of time of the movement of the tape winding body hinders the improvement of productivity.

Two systems for winding a magnetic tape for a cassette are used today. One of them is an open winding system in which the tape is neatly wound and then inserted into the cassette so as to be a finished product. The other is an in-cassette winding system which is also called C-O winding system or V-O winding system and in which the tape is wound at the final stage of assembly of the cassette.

As for the in-cassette winding system, as illustrated in FIG. 3, the cassette 23 without the magnetic tape is first assembled, an outgoing tape winding body 2 and an incoming tape winding body 3 which are coupled to each other by a leading tape 10 are inserted into the cassette 23 and screws are tightened so as to provide an unfinished product generally called V-O, C-O or the like. In the unfinished product, the leading tape 10 is partly pulled out by an in-cassette winder and cut off in the middle. The front end of a magnetic tape T is joined to one cut-off end of the leading tape 10 whose other cut-off end is held by a suction member 22. The tape winding body 2 having the leading tape joined to the magnetic tape T is rotated to wind a prescribed length of the magnetic tape T on the body 2. The magnetic tape T is then cut off. The rear end of the magnetic tape T wound on the winding body 2 is then joined to the other cut-off end of the leading tape 10, thus finishing the product. Since the wound state of the magnetic tape T entirely depends on the physical properties of the tape and the accuracy of the assembly of the cassette, the wound state cannot be controlled to be good. For that reason, the yield of well-wound magnetic tapes is low.

In order to increase the yield, a roller 24, shown in FIG. 4, having an upper and a lower flanges 25 has been provided on a trial basis to apply a force to the magnetic tape in the direction of the width thereof to push the tape sideward. However, after all, there is no good means available to improve the wound state of the magnetic tape.

Although the conventional winding systems shown in FIGS. 1, 2, 3 and 4 are used for neatly winding a magnetic tape after the tape is made as source tape or as a tape of smaller width, yet another magnetic tape of a large width and not yet made into a source tape has also been desired to be neatly wound without using a member such as a flange which restricts the motion of the side edge of the tape.

The use of magnets to align a magnetic tape is disclosed in Japanese Patent Application No. 51642/86, Japanese Patent Applications Nos. 16886/86, 48899/86 and 48900/86 (combined into a corresponding U.S. patent application Ser. No. 008040, filed Jan. 20, 1987) and 16887/86 and 57581/86 (combined into a corresponding U.S. patent application Ser. No. 008494, filed Jan. 22, 1987).

SUMMARY OF THE INVENTION

The present invention was made in consideration of the above-mentioned circumstances.

Accordingly, it is an object of the present invention to provide a method and a device for neatly winding a magnetic tape on a tape winding body even if the physical properties of the tape are irregular.

It is another object of the present invention to provide a method for winding a magnetic tape without a complicated winding device and without degrading the quality of the tape as in the above-described neat winding systems, so as to improve the working properties of the process of winding of the tape.

It is still another object of the present invention to provide a method and a device for winding a magnetic tape to greatly improve the wound state of the tape even if the tape is used with the in-cassette winding system or has a large width such as before being made into a source tape or is an already cut-off tape.

One of the methods is characterized in that a magnetic field for applying an urging force to the magnetic tape in a prescribed direction is provided at least near a tape winding body when the tape is wound on the body and then the tape is demagnetized after being wound on the body.

Another one of the methods is characterized in that a magnetic field for applying an urging force to the magnetic tape in a prescribed direction is provided at least at the place of a tape winding body by an electromagnet when the tape is wound on the body. Furthermore, a magnetic field for demagnetizing the tape is provided by the same electromagnet at or after the end of the winding of the tape on the body. The method is performed by the corresponding device in which the tape winding body is rotated to wind the magnetic tape thereon. The device is characterized by the electromagnet for applying the magnetic field to the tape. Either a direct current or an alternating current can be optionally caused to flow through the electromagnet. Furthermore, the magnitude of the current can be optionally changed.

BRIEF DESCRIPTION OF THE DRAWINGS

FIG. 8 shows a schematic front view of a winding device which is a second embodiment of the present invention.

FIG. 9 shows a schematic side view of the winding device shown in FIG. 8.

FIG. 10 shows an enlarged perspective view of a magnet shown in FIG. 9.

DETAILED DESCRIPTION OF THE PREFERRED EMBODIMENTS

Figure 5:
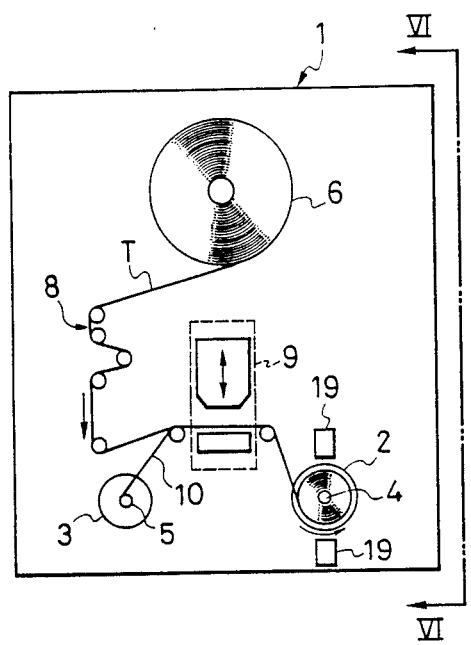
FIG. 5 shows a schematic front view of a winding device which is a first embodiment of the present invention.
Figure 6:
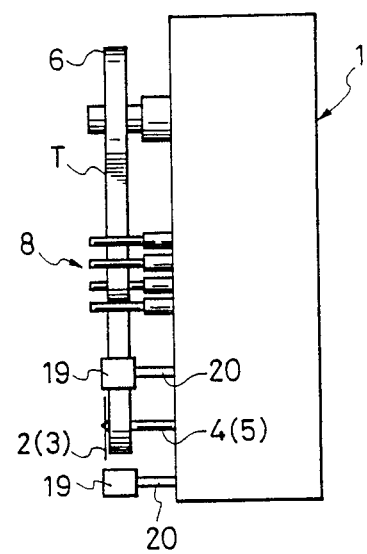
FIG. 6 shows a schematic side view of the winding device shown in FIG. 5.

Embodiments of the present invention are hereafter described in detail with reference to the drawings. FIG. 5 shows a magnetic tape winding device 1 which is the first embodiment of the present invention. FIG. 6 shows a side view of the device 1 seen along an line VI—VI shown in FIG. 5.

The magnetic tape winding device 1 is used to perform a method in which a magnetic tape T is wound on a pair of tape winding bodies 2 and 3 (which are hereinafter also referred to as tape reels) before the tape and the tape winding bodies are put in a video tape cassette or the like.

The operation of the magnetic tape winding device 1 is described from now on. The tape reels 2 and 3 coupled to each other by a leading tape 10 (only half of which is shown in FIG. 5) having a prescribed length are mounted on shafts 4 and 5, which can be rotated. The leading tape 10 is then cut off at almost its central portion. The cut-off end of the leading tape 10 at the tape reel 2 is joined to the front end of the previously-mounted magnetic tape source 6 by a splicing tape or the like. After the magnetic tape T wound by a prescribed length on the tape reel 2 is cut off, the cut-off end of the tape T is joined to the other cut-off end of the leading tape 10 at the other tape reel 3. The cutting off of the leading tape 10 and the magnetic tape T and the splicing of them are performed by a cutoff and splicing means 9 including a tape end holder, a cutter and the splicing tape. The cutoff and splicing means 9 is not shown in FIG. 6.

The magnetic tape T supplied from the tape source 6 is wound on the tape reel 2 (the take-up reel) through a transport system 8 including guide pins and guide rollers.

Figure 7:
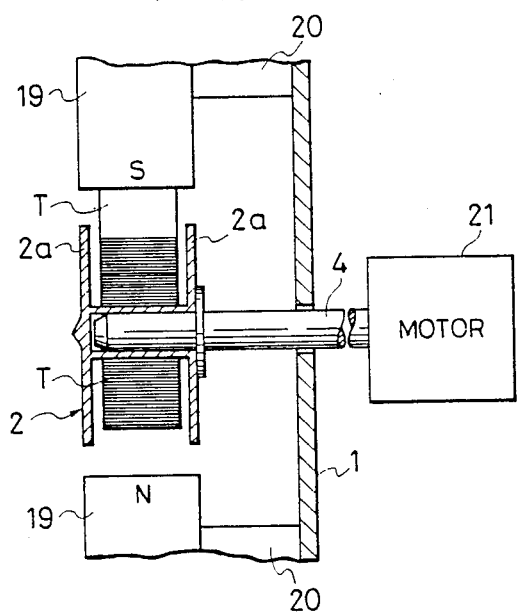
FIG. 7 shows an enlarged sectional view of a main portion along a shaft shown in FIG. 6.

The above-described range of the operation is the same as a conventional winding device. One feature of the winding device 1 provided in accordance with the present invention consists in a mounting portion of the take-up tape reel 2. At the mounting portion, a pair of permanent magnets 19 are provided around the take-up tape reel 2, on which the magnetic tape T is wound. The permanent magnets 19 are attached to the body of the winding device 1 by supports 20 so that the magnets extend along the diametric direction of the tape reel 2 and are located symmetrically to each other as to the axis of gyration of the tape reel 2. As shown in FIG. 7, the mutually inverse poles of the permanent magnets 19 are opposed to each other so that the magnetic field between the poles extends almost along the diametric direction of the take-up tape reel 2. An urging force can be applied to the magnetic tape T in a prescribed direction by the magnetic field.

The shaft 4 is connected to a drive means 21 such as a motor so as to be rotated thereby. When the magnetic tape T is wound at a winding section constructed as described above, the tape is located in the lines of magnetic force which extend straight from the north pole of one of the permanent magnets 19 to the south pole of the other. For that reason, the wound turns of the magnetic tape T are pulled to each other along the direction of the thickness of the tape so that the frictional force between the wound turns is increased. As a result, the deviation or the like of the tape T, which would occur along the direction of its width due to the change in the behavior of the tape as the tape is wound, is prevented without mechanical contact with the tape. Therefore, the side edges of the magnetic tape T are evened up so that the tape is very neatly wound and is kept in the very neatly wound state.

Center winding, in which the magnetic tape T is wound almost in the middle between both the flanges 2a of the tape reel 2 without coming into contact with the flanges, as shown in FIG. 7, can thus be performed.

FIG. 8 shows a schematic front view of a magnetic tape winding device 1 which is the second embodiment of the present invention. FIG. 9 shows a side view of the device 1 seen along the line IX—IX shown in FIG. 8. The same numerals in FIGS. 8 and 9 denote the same portions with the same functions as those shown in FIGS. 5, 6 and 7.

Figure 11:
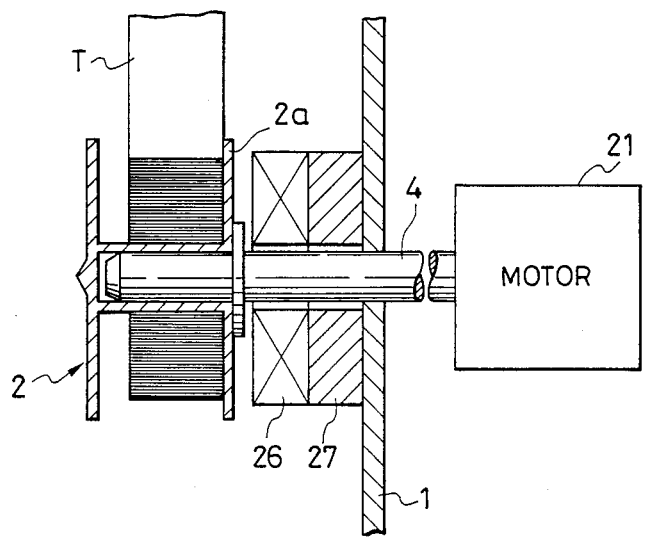
FIG. 11 shows an enlarged sectional view along a shaft shown in FIG. 9.

The second embodiment is characterized by a mounting portion for the take-up tape reel 2. At the mounting portion, an annular electromagnet 26 shown in FIGS. 10 and 11 is provided around the shaft 4 fitted in the center hole of the take-up tape reel 2 on which the magnetic tape T is wound. The annular electromagnet 26 is held by a support 27 so that the electromagnet 26 is attached to the body of the winding device 1 and located near one flange 2a of the tape reel 2. The elecgromagnet 26 comprises a cylindrical core 26b and a coil 26a provided around the core. The width L of the electromagnet 26 along the diametric direction of the take-up reel 2 is preferably made larger than that of the roll of the wound tape T. As a result, the magnetic field generated by the electromagnet 26 and applied to the magnetic tape T wound on the tape reel 2 extends almost along the shaft 4. Either a direct current or an alternating current can be optionally caused to flow through the coil 26a. The magnitude of each of the currents can be optionally changed by a selectable and variable AC/DC current source 28.

The shaft 4 is connected to a drive means 21 such as a motor so as to be rotated thereby. When the magnetic tape T is wound at a winding section constructed as described above, the direct current is caused to flow through the coil 26a of the electromagnet 26 to pull the tape toward the electromagnet to bring one side edge of the tape into contact with the flange 2a of the reel 2 on which the tape is wound.

Since the magnetic tape T already wound on the reel 2 receives the magnetic pulling force as well as the tape T being wound on the reel, the tape is kept in a stable state. The magnetic field acts so that the magnetic tape T coated with a magnetic substance receives the urging force without actual contact. As a result, the magnetic tape T is kept from deviating along the direction of the width of the tape, so that the tape is very neatly wound. When the magnetic tape T is wound at a high speed, air is entrained together with the tape to make an air layer between the already wound turns of the tape T so that the tape T being wound is made very easy to move along the direction of its width. In that case in particular, the side edges of the magnetic tape can be easily evened up by the magnetic action of the electromagnet 26.

Since the direct current is caused to flow through the coil 26a as described above, the electromagnet 26 functions to apply the urging force to the magnetic tape T in a prescribed direction. However, since the magnetic tape T is magnetized by the electromagnet 26, measures described below are taken. At or after the end of the winding of the magnetic tape T on the tape reel 2, the direct current caused to flow through the electromagnet 26 is replaced by the alternating current whose magnitude is gradually decreased to zero. The already wound magnetic tape T is thus demagnetized at its winding site so that the quality of the wound tape is enhanced because of the removal of a noise or the like which would drive from the magnetization of the tape.

Although the electromagnet 26 is secured in a prescribed position in the second embodiment, the electromagnet may be rendered movable along the shaft 4. The electromagnet 26 may not be annularly formed and extend around the shaft 4 along the total circumference thereof but may extend to apply the magnetic field to the magnetic tape T along only a part of the circumference of the shaft 4. The electromagnet 26 may have each of various forms.

Although the magnetic field applied to the magnetic tape T is oriented almost along the direction of the width of the tape, present invention is not confined thereto. The electromagnet 26 may be displaced along the diametric direction of the tape reel 2. The electromagnet 26 may consist of a plurality of electromagnets whose mutually inverse poles are opposed to each other along the diametric direction of the tape reel 2 so that the magnetic field generated by the electromagnets is applied to the magnetic tape T while it is being wound. In that case, a force acts to pull the wound turns of the magnetic tape T to each other along the direction of the thickness thereof to increase the friction between the wound turns to tightly wind the tape without letting it deviate along the direction of its width. The magnetic tape T can thus be neatly wound on the tape reel 2 even if the reel does not have a flange or the like for truing up the side edges of the tape.

Although the magnets 19 and 26 are provided only at the shaft 4 in the above-described embodiments, the present invention is not confined thereto. For example, the transport system 8 for moving the magnetic tape T may be appropriately provided with a magnet to apply a magnetic force to the tape along the direction of its width to suppress the swing of the tape along that direction to stabilize the movement of the tape. In the first and the second embodiments, the intensity of the magnetism of the permanent magnet 19 and of the electromagnet 26 is not particularly limited but may be set in consideration of the tension of the tape T at the time of the winding thereof, the kind of the tape, the distance between the tape and the magnet, the speed of the winding or movement of the tape and so forth.

Each of the permanent magnets 19 in the first embodiment may be substituted by an electromagnet.

Figure 12:
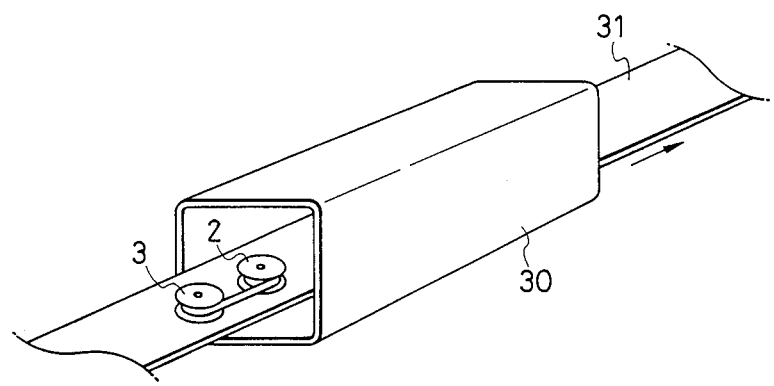
FIG. 12 shows a schematic perspective view of a demagnetizer provided in accordance with the present invention.

Although the magnetic tape T wound in the magnetic field as described above is magnetized thereby, the tape can be demagnetized by a demagnetizer 30 shown in FIG. 12. The demagnetizer 30 is shaped as a tunnel so that the magnetic tape T is passed through it by a conveyance means such as a conveyor belt 31 in about 5 to 10 seconds as the tape wound on the tape reel 2 and coupled to another tape reel 3 is directly put on the conveyance means or a cassette containing the tape and the reels in put on the conveyance means. The demagnetizer 30 is a conventional electromagnet through which an alternating current is caused to flow. The magnetic tape T can thus be demagnetized to enhance its recording and reproducing properties to reduce noise.

Although the permanent magnets 19 are secured in prescribed positions in the first embodiment, the permanent magnets may be rendered movable along the diametric direction of the tape reel 2 to cope with the size of the reel and to optionally change the intensity of the magnetic force which acts to the magnetic tape T.

The demagnetizer 30 is not confined to the construction shown in FIG. 12 but may have one of several different constructions.

The direction of the magnetic field, which is applied to the magnetic tape T at the time of the winding thereof in accordance with the present invention, is not particularly limited.

Figure 1:
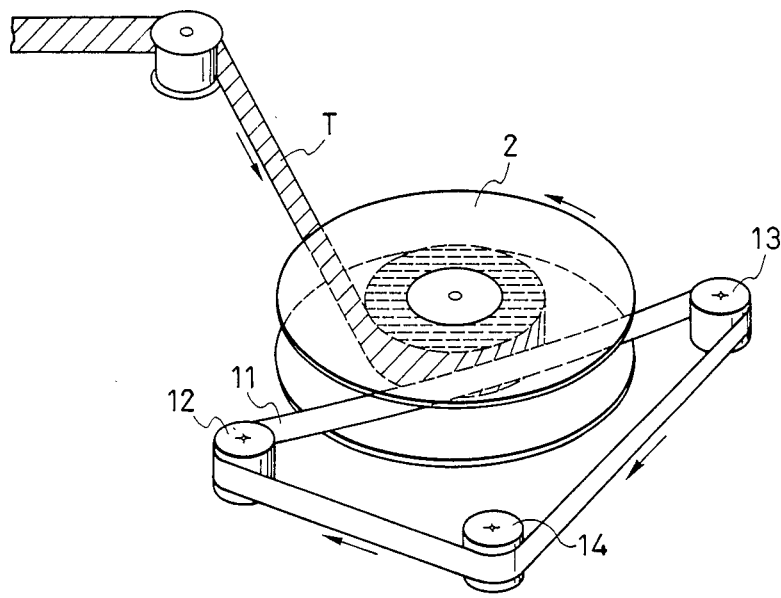
FIGS. 1 and 2 show perspective schematic views of portions of two conventional winding devices.
Figure 2:
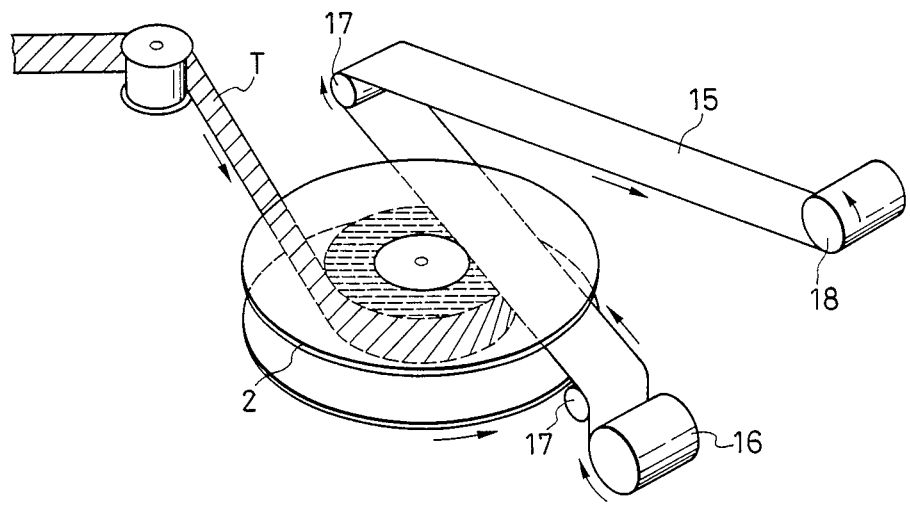
Figure 3:
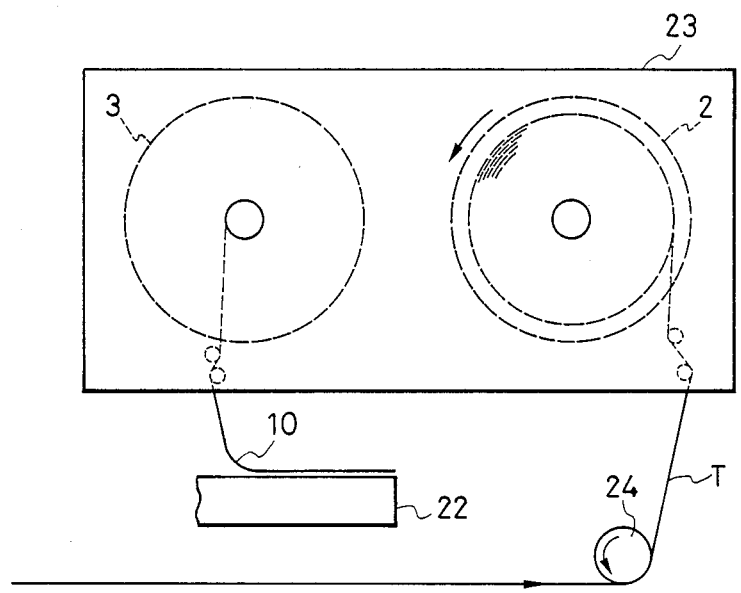
FIG. 3 shows a schematic plan view of a conventional winding device in the in-cassette winding system.
Figure 4:
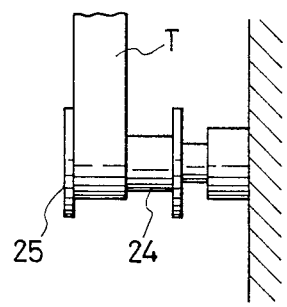
FIG. 4 shows an enlarged side view of a main portion of FIG. 3.
Figure 13:
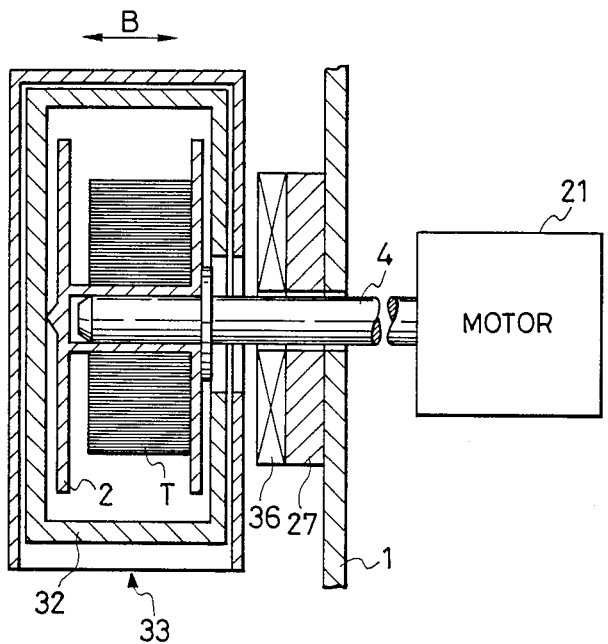
FIG. 13 shows a sectional view of a main portion of a winding device in the in-cassette winding system.
Figure 14:
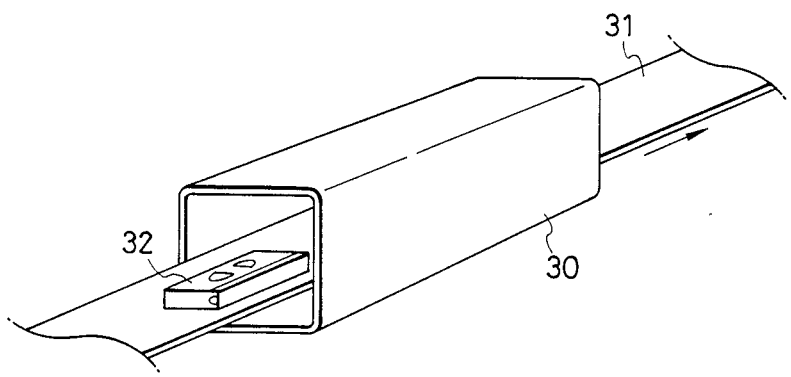
FIG. 14 shows a perspective schematic view of a demagnetizer for the in-cassette winding system.

Although each of the first and the second embodiments is the winding device in an open-reel winding system, the present invention can be also applied to a winding device in the in-cassette winding system as shown in FIG. 13 which indicates a sectional view of a cassette 32 along a shaft 4. The cassette 32 contains a pair of tape reels 2 and is held by a cassette holder 33. FIG. 13 does not show a means for supporting the cassette holder 33. Similarly to a conventional cassette holder, the cassette holder 33 has a cassette takeout opening facing down in to FIG. 13 and can be appropriately moved along the axial direction of the shaft 4 (along the direction of an arrow B in the drawing) to attach and detach the cassette 30. An annular permanent magnet 36 is mounted below the cassette holder 33 (at the panel of the body of the winding device) by a support 27 and surrounds the shaft 4. Since the process of winding a magnetic tape T by the winding device is almost the same as that described with reference to FIG. 3, the process is not described herein. When the magnetic tape T is wound in the cassette 32, the tape is attached by the magnet 36 so that the tape is placed on one flange (right-hand flange in FIG. 13) of the tape reel 2. For that reason, the tape T is very neatly wound on the reel 2. In that case, not only the magnetic tape T but also a metal member such as a guide pin in the cassette 32 are magnetized. However, they can be demagnetized together by a demagnetizer 30 as shown in FIG. 14, as the tape remains in the cassette 32. The demagnetizer 30 shown in FIG. 14 may be the same as that shown in FIG. 12. Since the very neatly wound tape T remains in the cassette 32 when the tape is moved from the winding process to the demagnetization process, the tape is unlikely to be damaged due to improper handling. Not only the magnetic tape T but also the metal member of the cassette 32 are thus demagnetized together to enhance the quality of the wound tape and the cassette as a whole.

Of course, although the embodiment shown in FIG. 13 is the winding device in the in-cassette winding system, it may also be applicable in the open-reel winding system.

The present invention is not confined to the above-described embodiments but can be applied to a process of winding a magnetic tape as source tape or be applied to a process of winding a magnetic tape as source from a cutter which makes another magnetic tape into the former.

The magnet in each of the above-mentioned embodiments may not be only a permanent magnet or an electromagnet but also other magnetic field generation means such as a solenoid.

According to the present invention, a magnetic field is applied to a magnetic tape at the time of winding thereof so that the wound turns of the tape are pulled to each other or the tape is pulled to one flange, as described above. For that reason, the movement of the tape is greatly stabilized to even up the side edges of the wound tape to very neatly wind it. Since a force for neatly winding the magnetic tape is applied to the tape without applying an external mechanical force to the tape and without bringing the tape into contact with anything, regardless of the presence of a reel flange, trouble is avoided such as a bend of the tape and the damage to the side edge or magnetic side of the tape, as is caused in the prior art. Therefore, the quality of the wound magnetic tape is enhanced.

A magnetic tape winding device provided in accordance with the present invention has a major advantage that a means for improving the wound state of a magnetic tape is not complicated.

It will be understood from the above description that according to the present invention, the quality of a wound magnetic tape and the productivity of a process of winding the tape are enhanced. Especially, a greatly improved method and a greatly improved device can be provided in accordance with the present invention when a tape winding body with no flange and the in-cassette winding system are adopted.

According to the present invention, a magnetized magnetic tape is demagnetized after being wound, so that a magnetic field applied to the tape at the time of the winding of the tape is prevented from adversely affecting the performance of the tape. Especially, not only the magnetic tape but also the member of a cassette are demagnetized together in the in-cassette winding system so as to greatly enhance the quality of the magnetic tape and the cassette as a whole.

What is claimed is:

1. A magnetic tape winding method, comprising:
    winding a magnetic tape onto a tape winding body as concentric tape turns;
    applying a magnetic field in a predetermined direction through the wound turns of said tape on said winding body during said winding to increase the friction force between the wound turns during winding to create tightly wrapped tape turns on said body during winding; and
    subjecting said wound tape to an alternating magnetic field of decreasing field strength subsequent to winding to demagnetize all of said magnetic tape after being completely wound on said tape winding body.

2. A winding method as recited in claim 1, wherein said applying step uses diametrically opposed permanent magnets on opposite sides of the wound turns of tape such that a DC field passes radially through that wound turns of tape during said magnetic field applying step to increase the friction force between the wound turns.

3. A winding method as recited in claim 1, wherein said magnetic field applying step and said demagnetizing step use a common electromagnet.

4. A winding method as recited in claim 1, wherein said demagnetizing step comprises passing said tape winding body wound with said magnetic tape through a demagnetizer.

5. A magnetic tape winding device, comprising:
a tape winding body;
means for rotating said tape winding body about an axis thereof with said tape attached thereto for winding a magnetic tape in concentric turns about on said tape winding body about said axis;
means for applying a magnetic field in a predetermined direction through said tape wound turns during said winding of said magnetic tape to thereby increase the friction force between wound turns to obtain tight winding of said tape wound turns; and
means for demagnetizing all of said magnetic tape after being completely wound on said tape winding body.

6. A winding device as recited in Claim 5, wherein said magnetic field applying means and said demagnetizing means commonly comprise:
an electromagnet;
a current source for selectively supplying a current source including means for supplying said electromagnet with a direct current and an alternating current; and
means for varying the amplitude of the output current of said current source, whereby application of direct current creates a DC magnetic field which increases the friction force between the wound turns during winding of the magnetic tape, and the application of alternating current provides an alternating magnetic field which demagnetizes all of the magnetic tape after being completely wound on the tape winding body, and wherein said amplitude changing means permits the alternating current to vary progressively to zero to insure complete demagnetization of the magnetic tape after being completely wound on said tape winding body.

7. A winding device as recited in claim 6, wherein said electromagnet is disposed adjacent said tape winding body.

8. A winding device as recited in claim 7, wherein said changing means causes said current source to output an alternating current of decreasing amplitude to thereby demagnetize said magnetic tape.

9. A winding device as recited in claim 5, wherein said applying means comprises a permanent magnet.

10. A winding device as claimed in claim 7, wherein said electromagnet is disposed axially adjacent said tape winding body such that with said current source supplying a direct current to said electromagnet, the DC magnetic field applied to the magnetic tape during winding evens up the edges of the wound tape, whereupon the tape after wind up is demagnetized by application of an alternating current of decreasing amplitude via said current source supplying an alternating current and via said means for changing the amplitude of the output current of said current source.

* * * * *